US008560407B2

(12) United States Patent
Buonagurio et al.

(10) Patent No.: US 8,560,407 B2

(45) Date of Patent: Oct. 15, 2013

(54) INVENTORY MANAGEMENT

(75) Inventors: Kevin Buonagurio, Saint Augustine, FL (US); Sarika Budhiraja, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 13/042,991

(22) Filed: Mar. 8, 2011

(65) Prior Publication Data

US 2012/0233039 A1 Sep. 13, 2012

(51) Int. Cl.

| | |
|---|---|
| ***G06Q 10/00*** | (2012.01) |
| *G06Q 30/00* | (2012.01) |
| *G06F 19/00* | (2011.01) |
| *G06F 17/30* | (2006.01) |
| *G06G 7/00* | (2006.01) |

(52) U.S. Cl.

USPC .......... 705/28; 705/7.31; 705/7.29; 705/7.37; 705/29; 235/385; 707/709; 700/216

(58) Field of Classification Search

USPC ...................................... 235/385; 705/28, 10

See application file for complete search history.

(56) References Cited

U.S. PATENT DOCUMENTS

| | | | | |
|---|---|---|---|---|
| 6,622,127 | B1 * | 9/2003 | Klots et al. | 705/28 |
| 7,212,976 | B2 | 5/2007 | Scheer | |
| 2002/0165782 | A1 | 11/2002 | Falkenstein et al. | |
| 2003/0172007 | A1 | 9/2003 | Helmolt et al. | |
| 2004/0107151 | A1 | 6/2004 | Bruns | |
| 2005/0075949 | A1 * | 4/2005 | Uhrig et al. | 705/28 |
| 2006/0054692 | A1 * | 3/2006 | Dickey | 235/385 |
| 2006/0069629 | A1 * | 3/2006 | Schweitzer et al. | 705/28 |
| 2007/0050235 | A1 * | 3/2007 | Ouimet | 705/10 |
| 2008/0086392 | A1 * | 4/2008 | Bishop et al. | 705/28 |
| 2009/0171816 | A1 * | 7/2009 | del Rosario et al. | 705/29 |

OTHER PUBLICATIONS

Simatupang, Togar M., Wright, Alan C., and Sridharan, Ramaswani., "The knowledge of coordination for supply chain integration", Business Process Management Journal, vol. 8 No. 3, 2002, p. 289.*

* cited by examiner

*Primary Examiner* — M. Thein

*Assistant Examiner* — Reva R Danzig

(74) *Attorney, Agent, or Firm* — Steven L. Nichols; Van Cott, Bagley, Cornwall & McCarthy P.C.

(57) ABSTRACT

A method for inventory management performed by a computerized inventory management system includes, with an inventory management system, receiving an initial inventory line comprising an item, a quantity, and a bin. The method further includes, with the inventory management system providing a split quantity user interface window in response to determining that the quantity of the item exceeds an actual quantity stored at the bin, creating and displaying a plurality of new inventory lines to replace the first inventory line in response to an autosplit control of the user interface being engaged, the new inventory lines including different bins, and providing a control through the user interface window to allow manual adjustment of the new inventory lines.

11 Claims, 5 Drawing Sheets

Inventory Lines Section (400)

402

| ITEM NUMBER (404) | ITEM NAME (406) | BIN (408) | QUANTITY (410) | REMAIN (412) |
|---|---|---|---|---|
| STN13597JH | Widgets | 12A-3b | 20 | 0 |
| STN13597JH | Widgets | 27C-4a | 12 | 0 |
| STN13597JH | Widgets | 8E-2c | 2 | 7 |
| | | | | |
| | | | | |

*Fig. 4A*

Inventory Lines Section (414)

402

| ITEM NUMBER (404) | ITEM NAME (406) | BIN (408) | QUANTITY (410) | REMAIN (412) |
|---|---|---|---|---|
| STN13597JH | Widgets | 12A-3b | 20 | 0 |
| STN13597JH | Widgets | 27C-4a | 7 | 5 |
| STN13597JH | Widgets | 8E-2c | 5 | 2 |
| | | | | |
| | | | | |

*Fig. 4B*

INVENTORY MANAGEMENT

BACKGROUND

Aspects of the present invention relate in general to inventory management, and more particularly, to methods and systems for the management inventory related transactions. Inventory management systems are commonly used to manage the inventory of an entity such as a business. These inventory management systems track incoming items, outgoing items, and transfers of items between different storage locations. Such transactions are often entered into a system as an inventory line. The inventory line may include a set of information related to the transaction such as the identification names or numbers for an item and the quantity requested for that item. These inventory lines are typically entered into the inventory management system by warehouse managers and other warehouse personnel.

BRIEF SUMMARY

A method for inventory management performed by a computerized inventory management system includes, with the inventory management system, receiving an initial inventory line comprising an item, a quantity, and a bin, with the inventory management system, providing a split quantity user interface window in response to determining that the quantity of the item exceeds an actual quantity stored at the bin, with the inventory management system, creating and displaying a plurality of new inventory lines to replace the first inventory line in response to an autosplit control of the user interface being engaged, the new inventory lines comprising different bins, and with the inventory management system, providing a control through the user interface window to allow manual adjustment of the new inventory lines.

A computerized inventory management system includes a processor and a memory communicatively coupled to the processor. The processor is configured to receive an initial inventory line comprising an item, a quantity, and a bin, provide a split quantity user interface window in response to determining that the quantity of the item exceeds an actual quantity stored at the bin, create and display a plurality of new inventory lines to replace the first inventory line in response to an autosplit control of the user interface being engaged, the new inventory lines comprising different bins, and provide a control through the user interface window to allow manual adjustment of the new inventory lines.

A computer program product for inventory management includes a computer readable storage medium having computer readable code embodied therewith. The computer readable program code includes computer readable program code configured to receive an initial inventory line comprising an item, a quantity, and a bin, computer readable program code configured to provide a split quantity user interface window in response to determining that the quantity of the item exceeds an actual quantity stored at the bin, computer readable program code configured to create and display a plurality of new inventory lines to replace the first inventory line in response to an autosplit control of the user interface being engaged, the new inventory lines comprising different bins, and computer readable program code configured to provide a control through the user interface window to allow manual adjustment of the new inventory lines.

BRIEF DESCRIPTION OF TEE SEVERAL VIEWS OF THE DRAWINGS

The accompanying drawings illustrate various embodiments of the principles described herein and are a part of the specification. The illustrated embodiments are merely examples and do not limit the scope of the claims.

FIGS. 4A and 4B are diagrams showing an illustrative inventory lines section of a split quantity user interface, according to one example of principles described herein.

Throughout the drawings, identical reference numbers designate similar, but not necessarily identical, elements.

DETAILED DESCRIPTION

Figure 1:
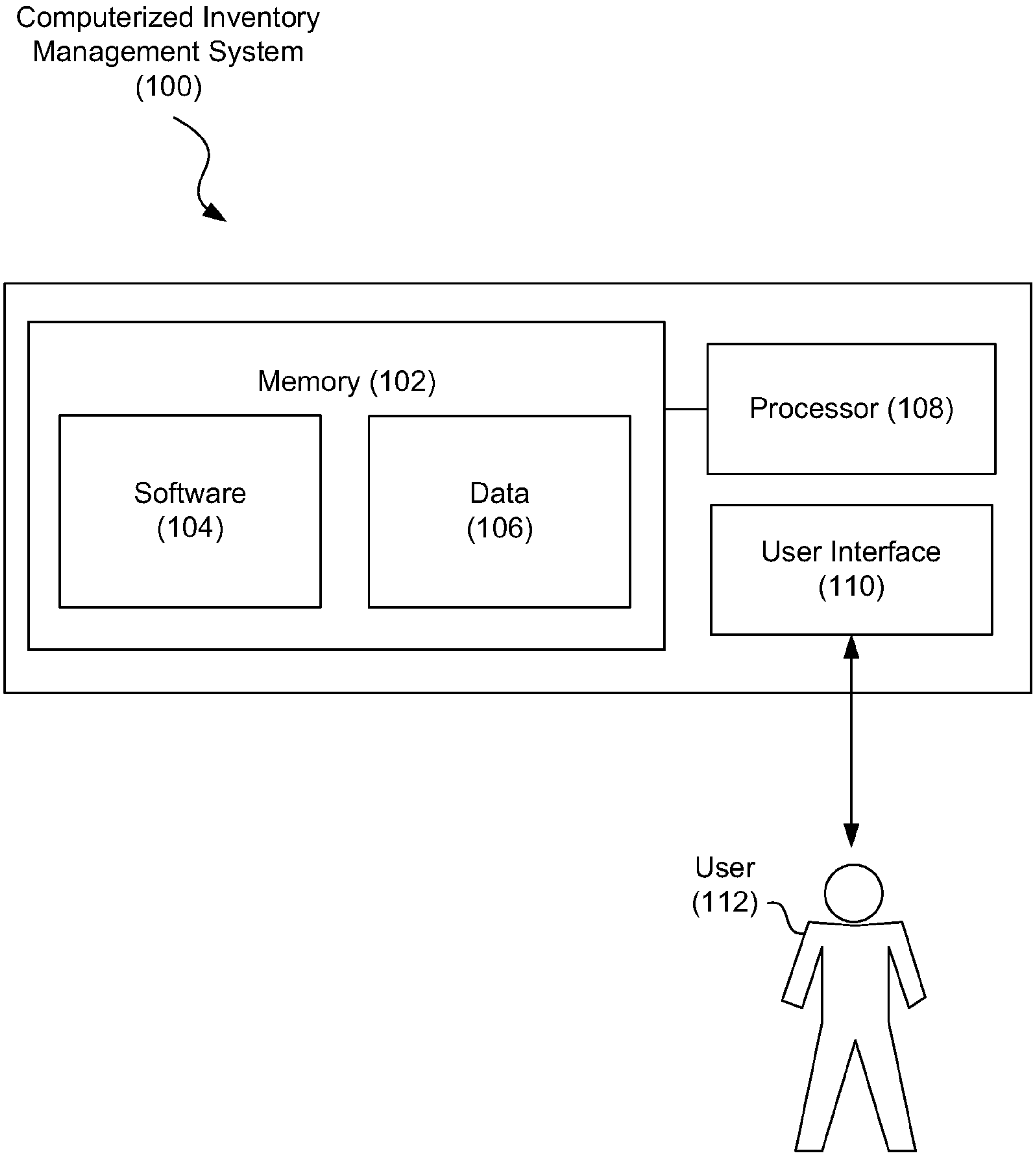
FIG. 1 is a diagram showing an illustrative diagram of a computerized inventory management system, according to one example of principles described herein.

As mentioned above, inventory management systems are typically used to manage items stored at various locations. Transactions that are associated with the receipt, dispatch, or transfer of items are often entered into the inventory management system as an inventory line. The inventory line includes identifying information of an item such as identification numbers and names, the quantity of items to be moved, and the current storage location items of those items.

In some cases, an inventory line entry requests the movement of items from a particular storage location that does not have enough of those items to meet the requested quantity. It may also be the case that other storage locations hold the quantity requested. In this case, multiple inventory lines can be created to replace the initial inventory line. These multiple inventory lines will each have different storage locations and quantities. The sum of the quantity from each storage location will be enough to meet the requested quantity from the initial inventory line.

The present specification discloses methods and systems that provide a single user interface to allow a user to handle a situation where the requested number of items within an inventory line entry cannot be met and multiple line entries need to be created in its place. This single user interface provides the user with the ability to automatically create the new inventory lines and manually adjust the automatically created inventory lines. Furthermore, the user is provided with other options such as adjusting the originally entered inventory line. All of these features are provided in a single user interface window. This provides flexibility and efficiency for the management of the inventory under the control of the inventory management system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "computerized inventory management system" is to be broadly interpreted as a system that includes hardware and software to provide a user with inventory management application functions.

Throughout this specification and in the appended claims, the term "bin" refers to a specific location at which an item may be stored. A bin may include a geographical location as well as a specific container or shelf to hold an item.

Referring now to the figures, FIG. 1 is a diagram showing an illustrative computerized inventory management system (100). According to certain illustrative examples, the inventory management system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The inventory management system (100) also includes a processor (108) for executing the software (104) and using or updating the data (106) stored in memory (102). The software (104) may include an operating system. An operating system allows other applications to interact properly with the hardware of the mobile computing system. The other applications may include inventory management software. The data (106) may include inventory lines that are stored in a format to be used by the inventory management application.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor. As will be described in more detail below, the user interface may provide a specific user interface such as a split quantity user interface. The split quantity user interface provides the user with tools to handle situations where requested transactions are not able to be completed based on the entry of a single inventory line.

Figure 2:
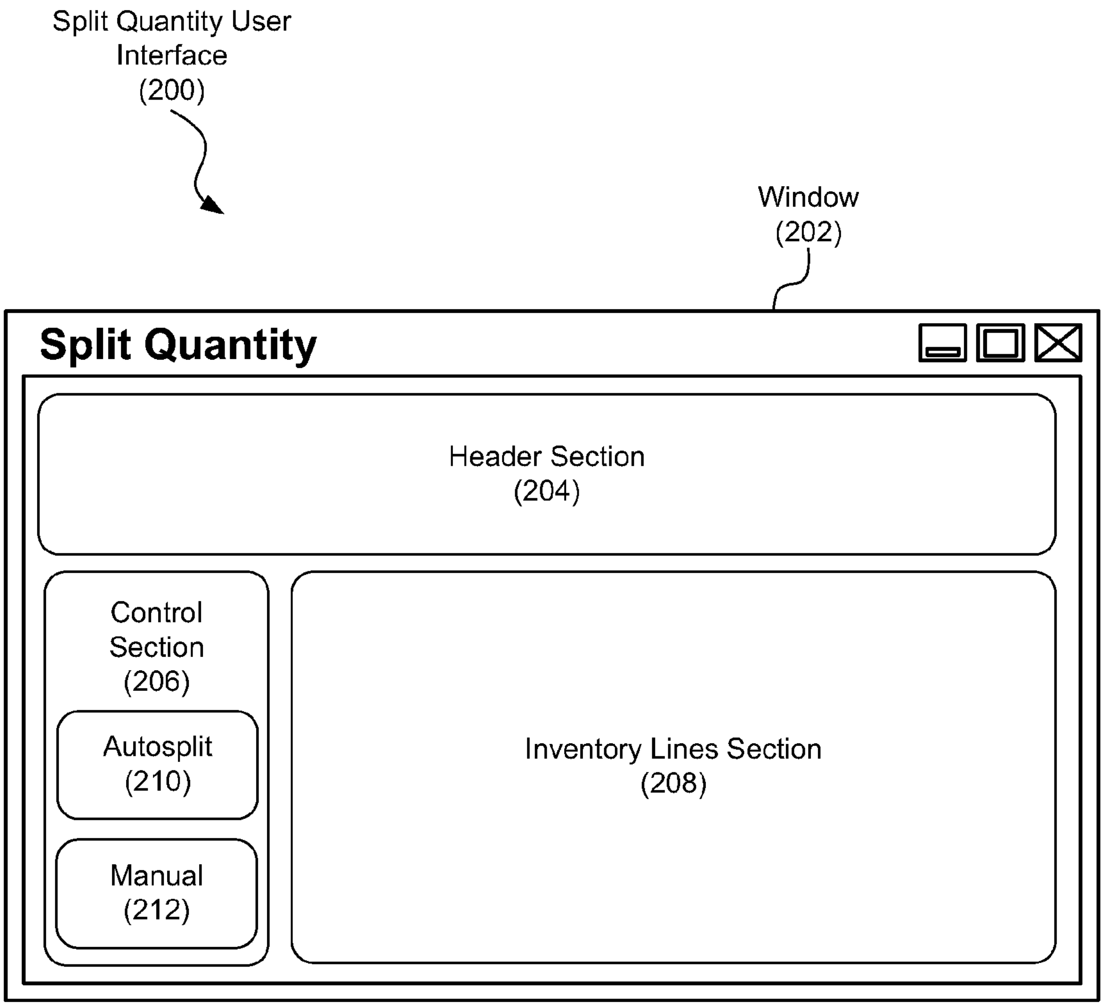
FIG. 2 is a diagram showing an illustrative split quantity user interface for an inventory management system, according to one example of principles described herein.

FIG. 2 is a diagram showing an illustrative split quantity user interface (200) for an inventory management system. According to certain illustrative examples, the split quantity user interface includes a header section (204), a control section (206) with an autosplit control (210) and a manual control (212), and an inventory lines section. In some cases, the split quantity user interface (200) appears in the form of a window (202) in response to a user entering a line that is not able to be processed. For example, a user enters a line into the inventory management system that requires 20 widgets to be taken from a particular bin. However, that bin only contains 15 widgets. Therefore, that line is not able to be processed. To meet the request, at least two lines should be entered into the system. One line will request 15 widgets from the originally requested bin and another line will request the remaining five widgets from a different bin. However, the user may not have knowledge of the quantity available in each bin that holds the requested widget.

The header section (204) will display information related to the originally entered inventory line to the user. This originally entered inventory line will be referred to as the initial inventory line. More detail about the header section will be discussed below in the text accompanying FIG. 3.

The control section (206) provides a number of tools to the user to handle the split quantity situation. One such tool is an autosplit control (210). The autosplit control (210) will automatically create new inventory lines to replace the initial inventory line. Using the above example, the new inventory lines will include a first inventory line requesting 15 widgets from a first bin and a second inventory line requesting the remaining 5 widgets from a second bin.

In some cases, the autosplit control (210) may operate under a set of constraints. For example, there may be several bins that store a particular item. These bins may have a ranking that indicates which bins should be exhausted before items can be removed from another bin. In some cases, the constraint may be alphabetical. Furthermore, some constraints may specify a minimum number of items to be left in a bin.

The manual control (212) allows the user to manually adjust the newly created inventory lines. For example, the user may wish to take the 5 remaining widgets from a third bin. Thus, the user may manually change the bin for the second inventory line to the third bin, in some cases, there may not be a specific manual control to allow manually adjustment. Rather, the user can simply make the adjustments directly to the inventory lines displayed in the inventory lines section (208).

The inventory lines section (208) displays the lines that will be created when the user is done with the split quantity dialog window (202). For example, when the user interface (202) first appears, the inventory lines section (208) may only display the initial inventory line that was entered by the user. After the user engages the autosplit control (210), the inventory lines section (208) may display the newly created inventory lines that will replace the initial inventory line.

Figure 3:
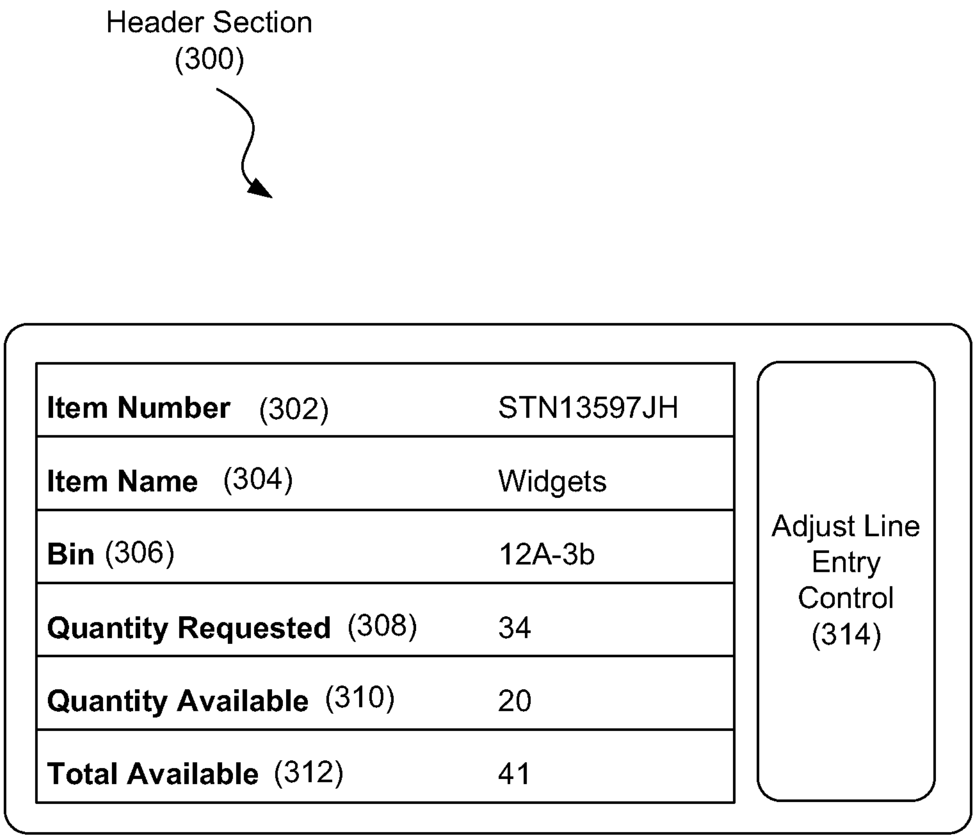
FIG. 3 is a diagram showing an illustrative header section of a split quantity user interface, according to one example of principles described herein.

FIG. 3 is a diagram showing an illustrative header section (300) of a split quantity user interface. As mentioned above, the header section (300) displays information related to the initial inventory line entered by a user. For examples, the header section (300) may include an item number (302), an item name (304), a bin (306), a quantity requested (308), a quantity available (310), and a total number available (312). Additionally, the header section (300) may include an adjust line entry control (214) to allow a user to manually adjust information associated with the initial inventory line.

Inventory management systems often keep track of items by assigning an item a number (302) in addition to the item name (304). This number is often referred to as a Stock Keeping Unit (SKU) number. In some cases, the SKU number may be a proprietary number assigned by a warehouse. In some cases, the SKU is assigned by the manufacturer of the item. Some inventory management systems may use both manufacturer and warehouse defined SKU numbers.

The bin (306) indicates the location of the requested item. A bin is typically assigned a number by the warehouse or entity in control of the inventory. The bin number specifies the location of a particular item. In some cases, a bin number is coded based on the location of the bin. For example, a bin number may be coded so as to indicate a particular aisle, row, shelf and even geographic location.

The quantity requested (308) shows the number of items requested from the requested bin in the initial inventory line. In some cases, a user does not need to enter a specific bin. Rather, a particular item may have a default primary bin. The quantity available (310) indicates the present number of items in the requested bin. This quantity available will presumably be less than the quantity requested because the split quantity dialog box appears in response to this particular situation.

The total available (312) shows the user the total number of items controlled by the entity operating the inventory management system. This allows the user to readily determine whether or not the requested quantity of items is even possible to meet. In some cases, an additional box or window may appear that informs the user of this specific situation. In this situation, the user may use the adjust line entry control (314) to change the quantity requested so that it is less than the total available (312).

The inventory management system may record certain changes made to the header section (300). The inventory management may then inform the proper personnel of the situation. For example, if the initial inventory line corresponds to a request from a customer to purchase a certain number of items and the entity operating the inventory management system does not currently have the total number on hand, then the appropriate sales person may be informed of this situation. The sales person can then inform the customer and work out a different deal.

In the example illustrated in FIG. 3, the initial inventory line includes a request for 34 widgets. However, only 20 widgets are available in the requested bin. Furthermore, there is a total of 41 available widgets, some of which are stored in other bins. Because, the total available still exceeds the quantity requested, the user does not need to make a change to the header section. However, the user may still make a change if so desired. For example, the user may wish to reduce the quantity requested so as to leave a certain amount of widgets in storage. Whether or not the user makes any changes, he or she will then go to the inventory lines section to manage the creation of new inventory lines to replace the initial inventory line.

FIG. 4A is a diagram showing an illustrative inventory lines section (400) of a split quantity user interface. As mentioned above, the inventory lines section (400) can display the new multiple lines that are created to replace the initial inventory line. The inventory lines (402) shown in FIG. 4 may have been created either manually or by using the autosplit control (e.g. 210, FIG. 2). According to certain illustrative examples, the inventory lines (402) may include an item number column (404), an item name column (406), a bin column (408), a quantity column (410), and a remain column (412).

In general, the item number (404) and item name (406) for each of the new inventory lines will be the same. However, in some cases, they may be different. For example, some inventory management systems may have different names or numbers for the same items. The different names or numbers of a similar item may correspond to different bins (408).

The bin for each of the new inventory lines (402) will be different for each line. The quantity column (410) of each new inventory line (402) indicates how many items will be taken from that bin to satisfy the original order. The remain column (412) of each new inventory line (402) indicates how many items will remain in that bin when the order corresponding to the new inventory lines is executed.

Continuing the example FIG. 3, the new inventory lines (402) illustrated in FIG. 4 show three inventory lines that are used to replace the initial inventory lines for 34 widgets. 20 of the widgets are taken from bin 12A-3*b*, 12 more widgets are taken from bin 27C-4*a*, and the remaining two widgets are taken from bin 8E-2*c*. Bin 12A-3*b* and 27C-4*a* would be left with zero widgets, and bin 8E-2*c* would be left with 7 widgets.

FIG. 4B is a diagram showing an illustrative inventory lines section of a split quantity user interface after manual adjustment has been made. Whether or not the new inventory lines illustrated in FIG. 4A were created with the autosplit control or manually, the user may manually adjust the inventory lines as desired. For example, it may be the case that the user desires to leave at least 5 widgets in bin 27C-4*a*. In this case, the user would adjust the remain column (412) of bin 27C-4*a* accordingly. The rest of the new inventory lines (402) may then be automatically updated in accordance with the change made by the user.

In some cases, the item requested may be a rotating item. A rotating item includes both an item number and a specific number unique to each instance of that item. For example, if the item is a laptop, there may be an item number for a particular model of laptop and a unique identification number for each specific laptop. If a particular laptop is to be issued to a particular employee, that transaction may be entered into the inventory management system as an inventory line. In one example, a user may enter an inventory line to issue a laptop to a particular employee and the inventory management system may determine that that laptop is not currently in the requested bin. In this case, the split quantity user interface window will display to the user a number of new inventory lines representing bins for other laptop computers which are available. The user may then select which laptop to issue. The initial inventory line will then be replaced with the new inventory line with the new bin.

The tools, controls, and sections of a split user quantity interface embodying principles described herein are not limited to those described or illustrated. Rather, the above descriptions and associated illustrations give examples of possible user interface characteristics which may be used to provide a user with the ability to effectively handle an inventory line that exceeds the available quantity in the associated bin. Particularly, the user interface provides the user with several tools in a single user interface window.

Figure 5:
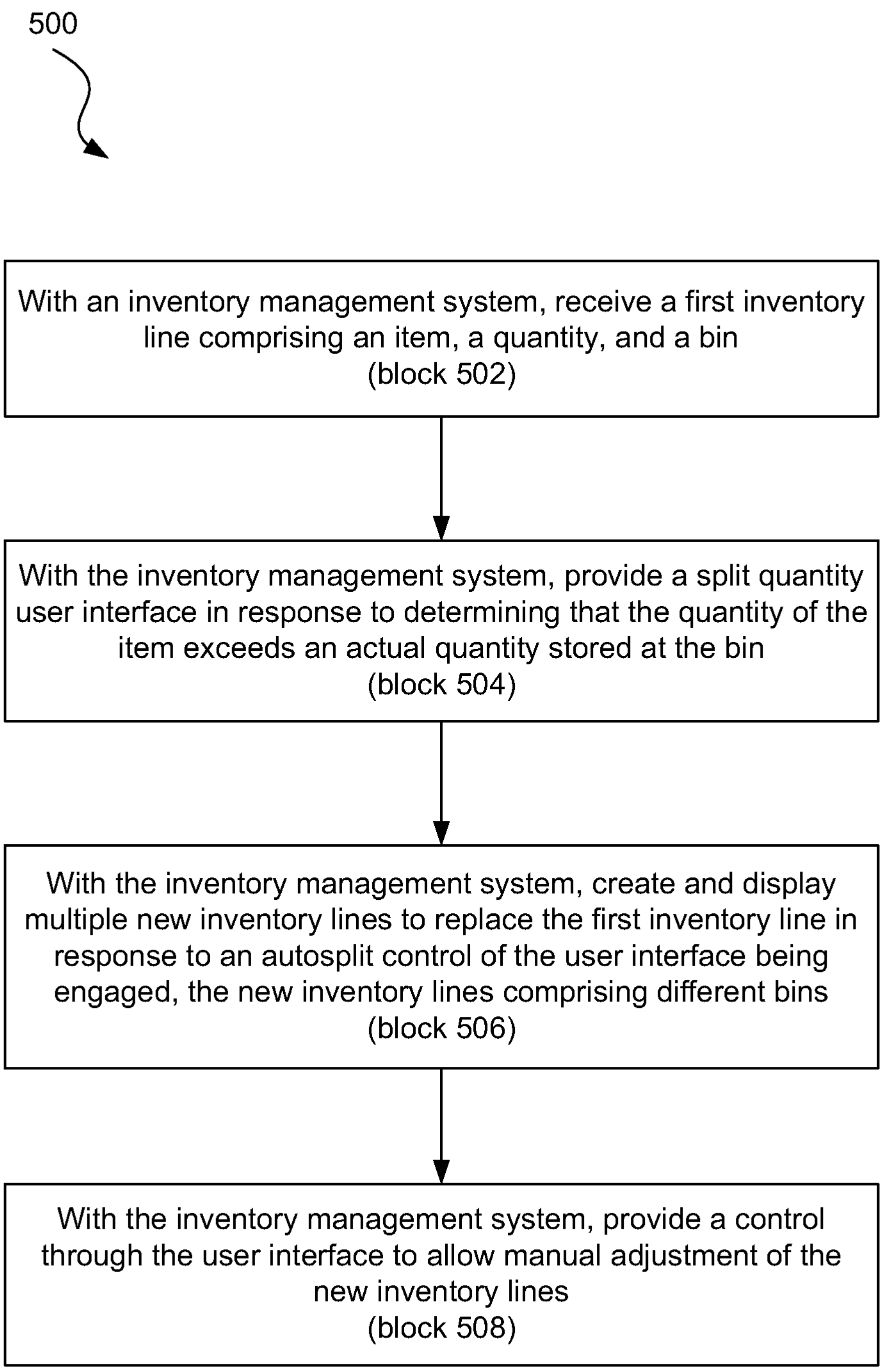
FIG. 5 is a diagram showing an illustrative method for inventory management, according to one example of principles described herein.

FIG. 5 is a diagram showing an illustrative method for inventory management. According to certain illustrative examples, the method includes, with an inventory management system, receiving (block 502) a first inventory line comprising an item, a quantity, and a bin, providing (block 504) a split quantity user interface in response to determining that the quantity of the item exceeds an actual quantity stored at the bin, creating and displaying (block 506) multiple new inventory lines to replace the first inventory line in response to an autosplit control of the user interface being engaged, the new inventory lines comprising different bins, and providing (block 508) a control through the user interface to allow manual adjustment of the new inventory lines.

Through use of a split quantity user interface window embodying principles described herein, a user may be provided with a number of tools to efficiently manage inventory lines that request a number of items in excess of an associated bin. These tools are displayed to the user in a single user interface window. Thus, the user does not need to undertake repetitive steps to find which inventory lines are acceptable and which are not. Furthermore, the creation of multiple lines to replace an initial inventory line is highly customizable with additional tools to help a user customize the new inventory lines appropriately.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for inventory management performed by a computerized inventory management system, the method comprising:

with said inventory management system, receiving an initial inventory line comprising an item, a requested quantity, and a requested bin;

determining that the requested quantity of said item exceeds an actual quantity stored at said requested bin;

with said inventory management system, automatically providing a split quantity user interface window in response to said determining that said requested quantity of said item exceeds an actual quantity stored at said requested bin, so as to entirely manage fulfillment of the requested quantity of the item within the split quantity user interface window, said split quantity user interface window comprising all of a header section describing said initial inventory line, a control section comprising an autosplit control and manual control, and an inventory lines section for listing new inventory lines to replace the initial inventory line;

with the autosplit control of said split quantity user interface of said inventory management system, creating and displaying a plurality of new inventory lines in said inventory lines section to replace said initial inventory line, said new inventory lines comprising different bins; and with the manual control in said control section of said split quantity user interface window of said inventory management system, providing a manual control in said control section of said user interface window to provide manual adjustment of said new inventory lines;

wherein to create said plurality of new inventory lines, said inventory management system uses a set of constraints comprising a ranking for different bins that indicates which bins should be exhausted before items are removed from other bins and a minimum number of items to be left in a particular bin; and fulfilling a request of said initial inventory line for the requested quantity of the item using said plurality of new inventory lines.

2. The method of claim 1, wherein said split quantity user interface window notifies a user if said quantity of said initial inventory line cannot be satisfied by creating new inventory lines.

3. The method of claim 1, further comprising, with said inventory management system, automatically updating each of said new inventory lines in response to a manual change to one of said new inventory lines.

4. The method of claim 1, wherein said item of said first inventory line is a rotating item comprising a unique identification number.

5. The method of claim 1, further comprising:

receiving user input modifying one of said plurality of new inventory lines; and automatically updating other of said new inventory lines in response to modification of one of said new inventory lines such that said plurality of new inventory lines continue to serve as a replacement for and, together match said quantity of, said initial inventory line.

6. A computerized inventory management system comprising:

a processor; and a memory communicatively coupled to said processor;

in which said processor is configured to:

receive an initial inventory line comprising an item, a requested quantity, and a requested bin;

determine that the requested quantity of said item exceeds an actual quantity stored at said requested bin;

automatically provide a split quantity user interface window in response to said determining that said requested quantity of said item exceeds an actual quantity stored at said requested bin, so as to entirely manage fulfillment of the requested quantity of the item within the split quantity user interface window, said split quantity user interface window comprising all of a header section describing said initial inventory line, a control section comprising an autosplit control an manual control, and an inventory section for listing new inventory lines to replace the initial inventory line;

in response to the autosplit control of said split quantity user interface window, create and display a plurality of new inventory lines in said inventory lines section to replace said initial inventory line, said new inventory lines comprising different bins; and in response to the manual control in said control section of said split quantity user interface window, receive manual adjustment of said new inventory lines;

wherein to create said plurality of new inventory lines, said inventory management system uses a set of constraints comprising a ranking for different bins that indicates which bins should be exhausted before items are removed from other bins and a minimum number of items to be left in a particular bin; and fulfill a request of said initial inventory line for the requested quantity of the item using said plurality of new inventory lines.

7. The system of claim 6, wherein said processor is further configured to notify a user, in said split quantity user interface window, if said quantity of said initial inventory line cannot be satisfied by creating new inventory lines.

8. The system of claim 6, wherein said processor is further configured to automatically update each of said new inventory lines in response to a manual change to one of said new inventory lines.

9. The system of claim 6, wherein said item of said first inventory line is a rotating item comprising a unique identification number.

10. The system of claim 6, in which said processor is further configured to:

receive user input modifying one of said plurality of new inventory lines; and automatically update other of said new inventory lines in response to modification of one of said new inventory lines such that said plurality of new inventory lines continue to serve as a replacement for and, together match said quantity of, said initial inventory line.

11. A computer program product for inventory management, said computer program product comprising:

a computer readable storage device having computer readable code embodied therewith, said computer readable program code comprising:

computer readable program code configured to receive an initial inventory line comprising an item, a requested quantity, and a requested bin;

computer readable program code configured to determine that the requested quantity of said item exceeds an actual quantity stored at said requested bin;

computer readable program code configured to automatically provide a split quantity user interface window in response to said determining that said requested quantity of said item exceeds an actual quantity stored at said requested bin, so as to entirely manage fulfillment of the requested quantity of the item within the split quantity user interface window, said split quantity user interface window comprising all of a header section describing said initial inventory line, a control section comprising an autosplit control and manual control, and an inventory lines section for listing new inventory lines to replace the initial inventory line;

computer readable program code configured to, in response to the autosplit control of said split quantity user interface, create and display a plurality of new inventory lines in said inventory lines section to replace said initial inventory line, said new inventory lines comprising different bins; and computer readable program code configured to provide a manual control in said control section of said split quantity user interface window to provide manual adjustment of said new inventory lines;

wherein to create said plurality of new inventory lines, said product for inventory management uses a set of constraints comprising a ranking for different bins that indicates which bins should be exhausted before items are removed from other bins and a minimum number of items to be left in a particular bin; and computer readable program code configured to fulfill a request of said initial inventory line for the requested quantity of the item using said plurality of new inventory lines.

* * * * *